(12) United States Patent
Tschanz

(10) Patent No.: US 6,964,278 B2
(45) Date of Patent: Nov. 15, 2005

(54) NON-INVASIVE GAUGE GLASS LIQUID LEVEL SENSOR APPARATUS

(76) Inventor: Thomas Tschanz, 660 Northmoor Rd., Lake Forest, IL (US) 60045

( * ) Notice: Subject to any disclaimer, the term of this patent is extended or adjusted under 35 U.S.C. 154(b) by 0 days.

(21) Appl. No.: 10/827,756

(22) Filed: Apr. 20, 2004

(65) Prior Publication Data

US 2005/0229974 A1 Oct. 20, 2005

(51) Int. Cl.[7] .......................... G01F 23/02; G01F 23/22
(52) U.S. Cl. .................... 137/392; 137/386; 73/290 R; 73/304 C; 73/323; 340/618; 340/620
(58) Field of Search ............................... 137/386–454; 73/290 R, 304 C, 323; 340/618, 620, 612

(56) References Cited

U.S. PATENT DOCUMENTS

| | | | |
|---|---|---|---|
| 3,939,360 A * | 2/1976 | Jackson | 307/118 |
| 4,484,862 A * | 11/1984 | Jensen | 417/36 |
| 4,749,988 A * | 6/1988 | Berman et al. | 340/618 |
| 5,289,846 A * | 3/1994 | Elias et al. | 137/392 |
| 5,315,872 A * | 5/1994 | Moser | 73/304 C |
| 5,465,766 A * | 11/1995 | Siegele et al. | 141/198 |
| 5,563,584 A * | 10/1996 | Rader et al. | 340/618 |
| 5,857,482 A * | 1/1999 | Dowling | 137/312 |
| 6,588,272 B2 * | 7/2003 | Mulrooney et al. | 73/324 |

* cited by examiner

Primary Examiner—Kevin Lee

(57) ABSTRACT

An apparatus is disclosed for electronically and non-invasively sensing liquid level in a boiler or other liquid-containing vessel. The apparatus, comprising a sensor and sensor integrated circuit can be uniquely designed for external attachment to any commercially available gauge glass used for visually determining liquid level in a boiler and other liquid-containing vessels. The apparatus, which employs proximity level-sensing technology, is suitable for determining liquid level provided the liquid-containing boiler or vessel is metallic and the liquid is electrically conductive, for example water and other aqueous solutions.

The apparatus can additionally comprise at least one, preferably two externally located electrical pushbutton switches, for example "water feed" and "test", for manually adding water to the boiler and for testing the apparatus' proper working condition with a simulated low water condition, respectively.

The apparatus can additionally comprise light emitting diodes (LEDs) to indicate status of a given system that employs the present invention, for example indication of power to the unit, low water condition, and water feed.

7 Claims, 2 Drawing Sheets

NON-INVASIVE GAUGE GLASS LIQUID LEVEL SENSOR APPARATUS

CROSS-REFERENCE TO RELATED APPLICATIONS

Not Applicable

STATEMENT REGARDING FEDERALLY SPONSORED RESEARCH/DEVELOPMENT

The present invention does not involve any form of federally sponsored research or development.

BACKGROUND OF THE INVENTION

This invention relates to a unique non-invasive liquid level detection apparatus, applied to vessels, for example steam boilers, expansion tanks for hot water hydronic systems, and blow down tanks, that incorporate a gauge glass for visual indication of liquid level within the vessel.

Liquid level sensing for steam boilers is critically important because operation of a boiler with less than the minimum required volume of water can result in catastrophic explosions and fires that can be lethal to the public and destructive to property and equipment. It is for this reason that the American Society of Mechanical Engineers Code (ASME CSD-1) and the American National Standards Institute Code (ANSI Z21.13a) mandate that every steam boiler include both a visual gauge glass for verification of proper water level within the boiler, and a safety control known as a Low Water Cutoff for automatically turning off the energy source to the boiler if the water level falls below the minimum safe level as specified by the manufacturer of the boiler.

There are two major types of liquid level sensors available for the protection of steam boilers. Those two types are mechanical float-actuated sensors, and electronic probe sensors. Each involves undesirable invasion of the interior boiler space for liquid level detection. Following is a discussion of each sensor type.

For decades, liquid level sensing for steam boilers has been provided by a mechanical apparatus consisting of a bulky bolted-on cast-iron float chamber attached to the boiler at the water line and communicating with the inside volume of the boiler. Float-actuated switches within the bolted-on float chamber are utilized to turn off the energy source for the boiler if the water level in the boiler should fall below a minimum acceptable level. Typically, electrical switches are also provided to open an electronic water-feed valve to restore the proper water level within the boiler. Deficiencies of mechanical liquid level detection systems include:

Mechanical float-actuated liquid level sensors as applied to a boiler require a relatively large float chamber, typically constructed of cast iron, that must be bolted and sealed to the boiler so that boiler water can enter the chamber under conditions of high temperature and pressure without leaking outside the boiler. Leakage and gasket repair are common problems in the industry.

A float chamber functions as a water reservoir, and boiler sediment, scale, minerals, and salts tend to be deposited within the chamber. A laborious daily procedure called "boiler blowdown" is required for steam boilers to drain water and scale from the float chamber. A poorly maintained float chamber collects scale and sediment and may become partially or even completely filled with sediment such that the float cannot operate, thereby compromising the code-mandated low-water protection for the boiler. Silted up float chambers are also a common problem in the industry.

Mechanical float-actuated liquid level sensors incorporate multiple intricate moving parts including floats, float arms, float-arm pivots, and switch contacts that are subject to wear and breakage, or to fouling and "hanging up" due to sedimentation.

Mechanical float-actuated liquid level sensors are relatively expensive and bulky as compared to electronic controls. Float-actuated controls are also difficult to install and to maintain, prone to develop leaks at the interface with the boiler or within the air-filled float itself, and provide only a limited operating range between "low" and "high" level detection as dictated by the limited length of the float arm and the limited size of the float chamber. These controls, moreover, must be installed at a precise location on the boiler, i.e., at the boiler waterline, and are subject to field failure with the possibility of catastrophic damage to the boiler and serious injury to the public.

The industry has been looking for a suitable alternative to mechanical float-actuated liquid level sensors for years. With the advent of new electronic technologies, float-actuated liquid level sensors are declining in popularity within the boiler industry and elsewhere.

Another liquid level sensing apparatus in wide usage incorporates an electronic control typically comprising at least one probe inserted into the boiler to sense the presence or absence of water at the probe tip or along the length of the probe. These probes are typically either bare metal stainless steel probes or completely jacketed stainless steel probes with an electrically non-conducting coating applied over the entire length of the probe. Electronic liquid level sensing devices operating upon the electrical conductance between the probe and the process liquid typically utilize bare-metal probes, whereas electronic liquid-level sensing devices operating upon the electrical capacitance between the probe and the process liquid use jacketed electrically insulated probes. The purpose of the jacket is to completely isolate the bare metal of the probe from the process liquid. Capacitance sensors experience total failure if liquid touches the bare metal of the probe through a leak path in the protective jacket.

The conductance and capacitance electronic probe liquid level sensors currently in widespread use provide improvements over the mechanical float-actuated sensors, but still have significant limitations as detailed below.

Electronic probe liquid level sensors require insertion of one or more probes into the boiler or into a liquid-filled chamber attached to and communicating with the interior space of the boiler. This requirement presents mechanical sealing difficulties because of the high temperatures and pressures within a boiler.

The corrosive action of high pressure steam on the probe jacket for capacitance-type sensors can cause degradation and failure of the insulating jacket and failure of the unit.

Bare-metal conductance-type probes mounted internal to the boiler are subject to fouling with scale that can reduce the detection sensitivity of the sensor. In some cases, the level sensor may become locked in an "unsafe" mode where loss of water cannot be detected because the probe is coated with a wet paste that remains on the probe even after the water level has fallen below the level of the probe. Damage or destruction of the boiler can result in such a circumstance.

Jacketed capacitance-type probes mounted internal to the boiler may develop pin-hole leaks in the electrically insulating jacket due to the effects of high pressure and high temperature steam, with consequent immediate failure of the device.

Probes mounted internal to the boiler cannot be inspected, serviced, or replaced without taking the boiler out of service.

Electronic probe liquid level sensors with probes mounted internal to the boiler cannot be conveniently tested to verify proper operation of the liquid level sensor. Although most electronic liquid level sensors incorporate a "test" function that verifies the proper working condition of the electronic circuitry, there is no test to evaluate the integrity of the probe. The circuit test does not verify the proper working condition of the liquid level sensor taken as a whole.

Other level sensing technologies exist, but are not in wide usage in the boiler industry either due to high cost or inadequate capabilities for the application.

U.S. Pat. No. 5,072,616 to Sherrick (1991) cites an optical liquid level detecting system utilizing the differences between the optical refractive index for steam and water as the mechanism for determining the presence of water or steam in the path of an optical beam traversing a sensing region. Detection schemes operating upon this optical principle suffer from vulnerability to opaque scale buildup common to boilers that can impair the transmission or reception of the optical beam. Should this occur, the system will not reliably detect the presence or absence of liquid in the sensing region. Additionally, precise alignment of the beam detector is critical to the proper operation of the system.

U.S. Pat. No. 4,671,110 to de Kock (1987) cites an electronic means for liquid level detection in boilers. The patent describes a sensor utilizing the capacitative, conductive, or resistive properties of the liquid to detect liquid level. The described apparatus utilizes a custom-manufactured gauge glass subjected to a special surface etching procedure and subsequent vapor-deposition process to impart to the glass—either on the inside surface or the outside surface—a thin conductive coating such as stannous oxide to serve as an electrical conductor for liquid detection.

The requirement for a specially prepared gauge glass poses a significant practical limitation in terms of application due to the cost and general unavailability of a customized gauge glass, as compared to a standard gauge glass. Additionally, an exposed thin conductive coating on the outside surface of a gauge glass renders the sensor unstable and susceptible to spurious operations whenever the glass tube is approached or contacted by a person or other object. A gauge glass with a thin conductive coating on the inside surface of the glass is subject to degradation from scale build up or actual erosion of the coating off the surface of the glass by action of the process liquid and steam.

BRIEF SUMMARY OF THE INVENTION

A method and an apparatus are disclosed for electronically and non-invasively sensing liquid levels in liquid-containing vessels, for example steam boilers, expansion tanks for hot water hydronic systems, and blow down tanks. The apparatus, comprising a sensor and sensor integrated circuit can be uniquely designed for external attachment to any commercially available gauge glass used for visually determining liquid level in a boiler and other liquid-containing vessels. The apparatus, which employs proximity level-sensing technology, is suitable for determining liquid level provided the liquid-containing boiler or vessel is metallic and the liquid is electrically conductive, for example water and other aqueous solutions.

The apparatus can additionally comprise at least one, preferably two externally located electrical pushbutton switches, for example "water feed" and "test", for manually adding water to the boiler and for testing the apparatus' proper working condition with a simulated low water condition, respectively.

The apparatus can additionally comprise light emitting diodes (LEDs) to indicate status of a given system employing the present invention, for example indication of power to the unit, low water condition of the vessel, and water feed.

Objectives

One objective of this Invention is to detect the presence or absence of aqueous liquid in a standard gauge glass attached to and communicating with an interior of a boiler and other liquid-containing vessels, with no moving parts, and without any sensing apparatus internal to the gauge glass and liquid-containing vessel.

A second objective of this Invention is to provide a means to automatically activate and deactivate alarms, pumps, valves, heaters and burners, and other process equipment with reference to the presence and absence of liquid at the level of the sensor affixed to the exterior of the gauge glass installed on the liquid-containing vessel.

A third objective of this Invention is to provide local indication of a low water and water feed condition by means of LEDs integral to the unit.

A fourth objective of the Invention is to provide a means of manually feeding water into the boiler and vessel by means of a manually operated electrical pushbutton water feed switch integral to the unit.

A fifth objective of the Invention is to provide a means of testing apparatus functionality by means of an electrical pushbutton test switch that simulates a low water event and affects operation of a low water LED and lockout of the burner circuit.

Advantages

The gauge glass liquid level sensor described herein has the following advantages relative to other commercially-available devices:

Many tanks and vessels, ranging from small coffee urns to large heating and process steam boilers, expansion tanks for hot water hydronic systems, and blow down tanks include a gauge glass to visually monitor the level of liquid in the boiler or vessel. For steam boilers, the gauge glass is required by industry codes ASME CSD-1 and ANSI Z21.13a. Consequently, a critical component of liquid level sensing systems, i.e., the gauge glass, is already installed and in place for many applications.

The Invention operates using a standard gauge glass, and does not require a custom manufactured or treated gauge glass.

The Invention is non-invasive and is completely unwetted by process liquid. It does not require any probes, floats or any other component inside the liquid-containing vessel and inside the gauge glass, nor any tapped or flanged fittings and associated seals into a given liquid-containing vessel.

The Invention has no moving parts, except for mechanical relay contacts controlling the electronic outputs.

The Invention is compatible with newly manufactured steam boilers, which by code must include a gauge glass, and can be installed in the factory with no design modifications to a given boiler.

The Invention is retrofitable in the field to any metallic tank, vessel, and boiler that includes a standard gauge glass.

The Invention does not require any "blowdown" procedure, as is required for boilers with float chambers and mechanical float-actuated liquid level sensors.

The Invention is easily replaceable in the field, without draining and without taking the boiler or vessel out of service.

Invention can be applied as a single point and a multiple-point liquid level sensor, unlike conductance single probe liquid level sensors that provide only single point liquid level detection, and The Invention, due to software enabled time delays and dual "high" and "low" level sensors, is immune to burner cycling common to single-probe level sensors that continuously oscillate around the critical liquid level.

The gauge glass liquid level sensor can include at least one (1) LEDs to indicate status of a given system that employs the present invention, for example power to the unit, low water condition, and water feed operation.

The gauge glass liquid level sensor can include at least one (1) electrical pushbutton switch. The switch can manually effect a water feed operation or a diagnostic test operation to prove device suitability for detecting a low water event within the boiler or vessel. Multiple switches can be provided to perform these and other functions.

The ease of installation of the Invention is apparent. The sensor is simply snapped into position on the gauge glass for new boilers still in the factory or for retrofit onto boilers already installed in the field.

The improved reliability in terms of total avoidance of leak-prone pressure seals into the boiler is apparent by the completely unwetted non-invasive nature of the Invention, The compact design makes for a space efficient liquid level detection system as compared to float-actuated systems with bulky float chambers affixed to the boiler vessel.

The high and low level sensors provide for an ample operating range for the liquid level that prevents cycling of the burner on the boiler that is common for single point level sensors.

The Invention allows automatic control of process and safety equipment including but not limited to pumps, burners, and alarms utilizing an existing standard gauge glass installed on the boiler or other liquid-containing vessel. Performance is not impaired by opaque scale buildup on the gauge glass that can impair optical liquid level sensors described by Sherrick (ref U.S. Pat. No. 5,072,616). The Invention is not susceptible to less than optimal operation resulting from fouling inside the gauge glass, such as that which can negatively impact the operation of other gauge glass sensors incorporating magnetized floats that move up and down inside the gauge glass in response to changes in liquid level. And, this invention provides an important improvement over devices described by de Kock that require the use of specially manufactured or treated stannous oxide-coated gauge glass tubes.

DETAILED DESCRIPTION OF THE PREFERRED EMBODIMENT

Figure 1:
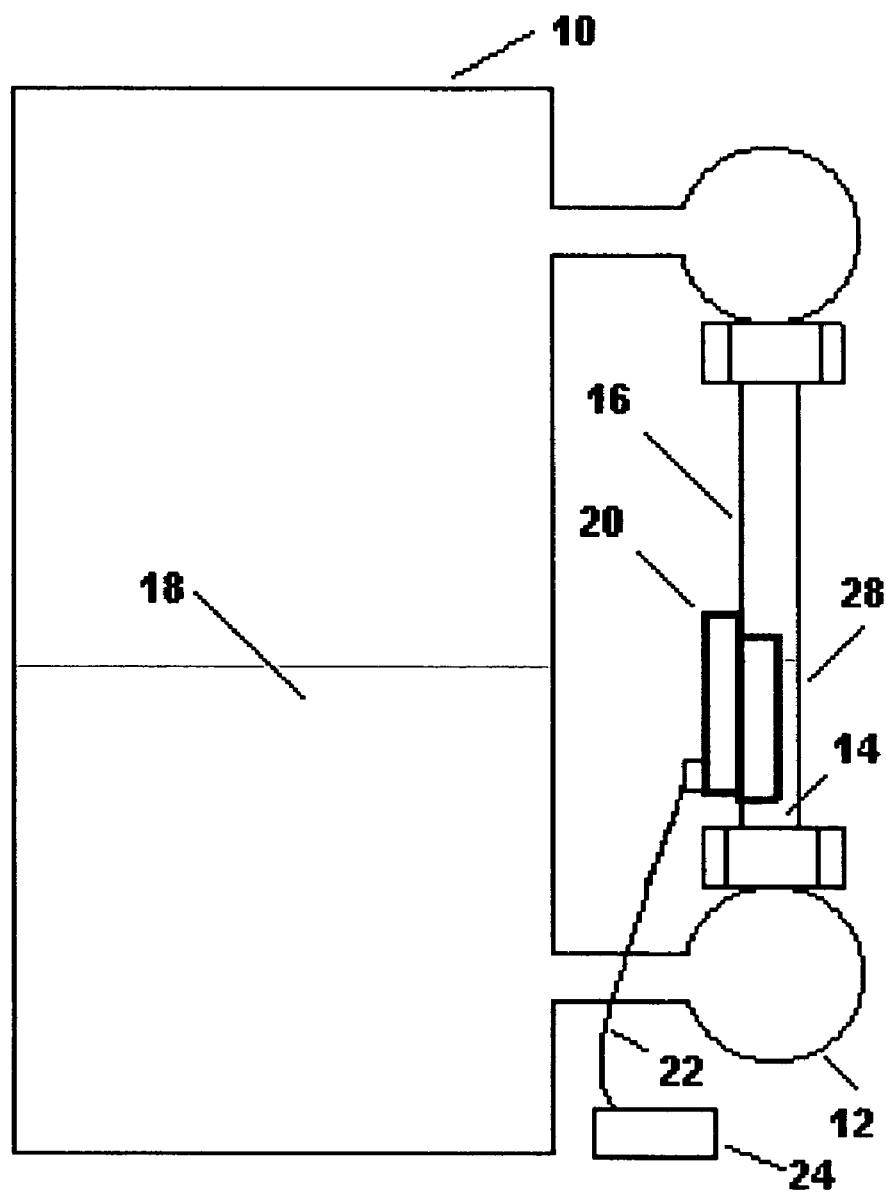
FIG. 1 shows application of the Invention to a gauge glass installed on a metallic vessel.

Referring to FIG. 1, a system configuration including the Invention is illustrated. As shown, an aqueous liquid (18) contained in a metallic vessel (10) communicates freely with a gauge glass assembly (12), the gauge glass assembly being attached to the metallic vessel, such that aqueous liquid (14) in a gauge glass (16) is at the same level as the aqueous liquid in the metallic vessel. Gauge glass liquid level sensor (20) is attached to a back exterior of the gauge glass so as to cover an expected range of liquid levels in the gauge glass, thus leaving a front side (28) of the gauge glass unobstructed for viewing. An electrical power and control cable (22) can connect a user-supplied 24-volt ac electrical transformer (24) to the liquid level sensor (20), and provides an electrical path for control outputs from the gauge glass liquid level sensor to operate ancillary equipment including but not limited to alarms, pumps, or burners.

Figure 2:
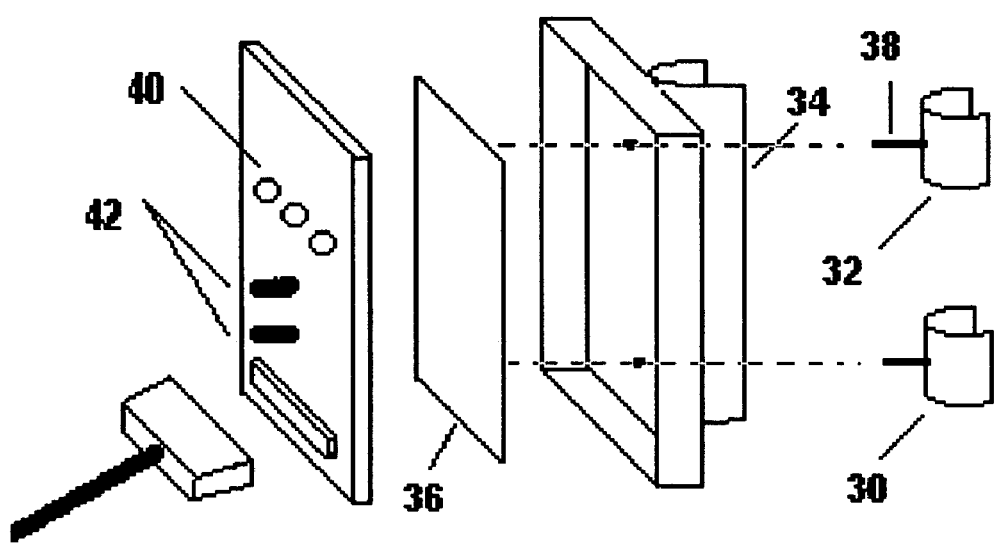
FIG. 2 shows an exploded view of major components of the non-invasive gauge glass liquid level sensor apparatus.

FIG. 2 shows an exploded view of the gauge-glass liquid level sensor. Specifically, it shows a lower conductive curved foil (30) and an upper conductive curved foil (32) used to sense presence and absence of liquid at a low level and at a high level, respectively, within the gauge glass. Ability to sense liquid level is enabled by employing readily available proximity sensing technology, preferably capacitance proximity sensing technology. FIG. 2 shows an exemplary position of said conductive curved foils on an inside circumference of a sensor tubular housing (34) such that each curved foil is maintained in intimate contact with the gauge glass when the sensor is installed on the gauge glass. The conductive curved foils are electrically connected to a sensor electronic circuit (36) by short electrical wires (38) projecting through holes in the tubular housing. A plurality of indicator light emitting diodes (40) can be provided to provide indication of power to the unit, low water, and water feed to the vessel. Manual water feed and manual testing of liquid level sensor functionality can be accomplished by two electrical pushbutton switches (42).

The gauge glass assembly (12) communicates with the interior space of the metallic vessel (10) such that liquid in the gauge glass (14) is at the same level as the liquid (18) inside the metallic vessel. Hence, monitoring liquid level in the gauge glass provides accurate indication of liquid level in the metallic vessel.

The Invention operates using proximity sensing technology. This technology, when applied to a sensor as described herein establishes a proximity sensing field extending from the electrically conductive curved foil (32) of the sensor through the gauge glass (16) and into the aqueous conductive liquid (14) within the gauge glass. Detection sensitivity of this system is a function of surface area presented by a fixed surface area of the gauge glass in contact with the conductive curved foil, as well as electrical conductivity of the aqueous liquid present at a given level, the level of which moves up and down inside the gauge glass in proximity to the electrically conductive curved foil.

Electrical circuitry can monitor change in electrical charge on the curved conductive foil, and can electrically change a state of digital outputs as the aqueous liquid level moves above or below the sensor foils. These outputs can change state, for example, from "high" +5V to "low" 0V with reference to a level of the aqueous liquid within the gauge glass and are applied to control on-board relays used to actuate connected process equipment including but not limited to pumps, valves, burners, alarms, and more.

Accordingly, the reader will see that the present Invention provides a unique, non-obvious, novel, useful and non-invasive liquid level sensing apparatus, and does not require a sensor inside a gauge glass, nor within a liquid-containing metallic vessel. This is a desirable feature because the metallic vessel can contain high temperatures and pressures, and an otherwise hostile environment not amenable to proper performance and longevity of internally situated sensing components.

I claim:

1. A non-invasive gauge glass liquid level sensor apparatus comprising:
    a tubular gauge glass, the tubular gauge glass having a specific outside circumference;
    a housing, the housing having an inside circumference closely approximating the outside circumference of said tubular gauge glass;
    the housing comprising electrically insulating material;
    at least one electrically conductive curved foil, the curved foil located on the inside circumference of the housing;
    an integrated circuit electrically connected to the curved foil, the integrated circuit employing capacitance proximity sensor technology;
    a means to receive electrical power, the means to receive electrical power electrically connected to the integrated circuit; and
    a means to send electrical signals from the integrated circuit to ancillary system equipment.

2. A non-invasive gauge glass liquid level sensor apparatus as in claim 1 further comprising a means to test functionality of the non-invasive gauge glass liquid level sensor apparatus, the means to test being electrically connected to the integrated circuit; and
    at least one switch, the switch being electrically connected to the means to test and the switch being electrically connected to the integrated circuit so as to function to actuate the means to test.

3. A non-invasive gauge glass liquid level sensor apparatus as in claim 1 further comprising a means to actuate a water feed, the means to actuate being electrically connected to the integrated circuit, the means to actuate being electrically connected to a water input valve; and
    at least one switch, the switch being electrically connected to the means to actuate and the switch being electrically connected to the integrated circuit so as to function to activate the means to actuate.

4. A non-invasive gauge glass liquid level sensor apparatus as in claim 1 further comprising at least one Light Emitting Diode (LED), the LED being electrically connected to the integrated circuit, the LED being located on an external surface of the housing such that it is visible to a user of the apparatus.

5. A non-invasive gauge glass liquid level sensor apparatus as in claim 2 further comprising at least one Light Emitting Diode (LED), the LED being electrically connected to the integrated circuit, the LED being located on an external surface of the housing such that it is visible to a user of the apparatus.

6. A non-invasive gauge glass liquid level sensor apparatus as in claim 3 further comprising at least one Light Emitting Diode (LED), the LED being electrically connected to the integrated circuit, the LED being located on an external surface of the housing such that it is visible to a user of the apparatus.

7. A non-invasive gauge glass liquid level sensor apparatus as in claim 1 further comprising a microprocessor programmed with unique software code to support the functionality described in claims 2 through 6.

* * * * *